United States Patent [19]

Thompson et al.

[11] Patent Number: 5,524,498
[45] Date of Patent: Jun. 11, 1996

[54] MOTOR FEEDBACK SIMULATION FOR TEST EQUIPMENT

[75] Inventors: Robert L. Thompson, Kokomo; David C. Leingang, Lafayette; Clinton W. Erickson, Kokomo, all of Ind.

[73] Assignee: Delco Electronics Corporation, Kokomo, Ind.

[21] Appl. No.: 431,222

[22] Filed: Apr. 28, 1995

[51] Int. Cl.$^6$ .......................... G01M 15/00; G01N 19/00
[52] U.S. Cl. .......................................................... 73/865.9
[58] Field of Search ..................... 73/116, 117.2, 73/117.3, 118.1, 865.9, 865.6, 117.1

[56] References Cited

U.S. PATENT DOCUMENTS

| | | | |
|---|---|---|---|
| 2,771,243 | 11/1956 | Wolin et al. | 73/117.1 |
| 2,829,826 | 8/1958 | Wolin et al. | 73/117.1 |
| 2,918,822 | 12/1959 | Mann | 73/865.9 |
| 3,302,107 | 1/1967 | Flaugher et al. | 73/865.9 |
| 4,300,205 | 11/1981 | Tansuwan | 73/865.9 |
| 4,926,352 | 5/1990 | Staffe | 73/117.3 |
| 4,943,238 | 7/1990 | Gregorio | 73/117.3 |
| 4,984,988 | 1/1991 | Mizushina et al. | 73/865.6 |
| 5,060,176 | 10/1991 | Nawa et al. | 73/116 |

*Primary Examiner*—Kenneth A. Wieder
*Assistant Examiner*—George M. Dombroske
*Attorney, Agent, or Firm*—Jimmy L. Funke

[57] ABSTRACT

To test a controller for a motor having a position feedback signal, a simulation circuit programmable by test equipment replaces the actual motor and emulates motors of various types. Motor direction command signals from the controller are detected by comparators in the simulation circuit and a counter is incremented or decremented according to the detected command. The initial count value, representing a beginning motor position and the count rate of change, representing motor speed, are programmed by the test equipment. The count is converted with high resolution to an analog feedback signal which is coupled to the controller.

16 Claims, 3 Drawing Sheets

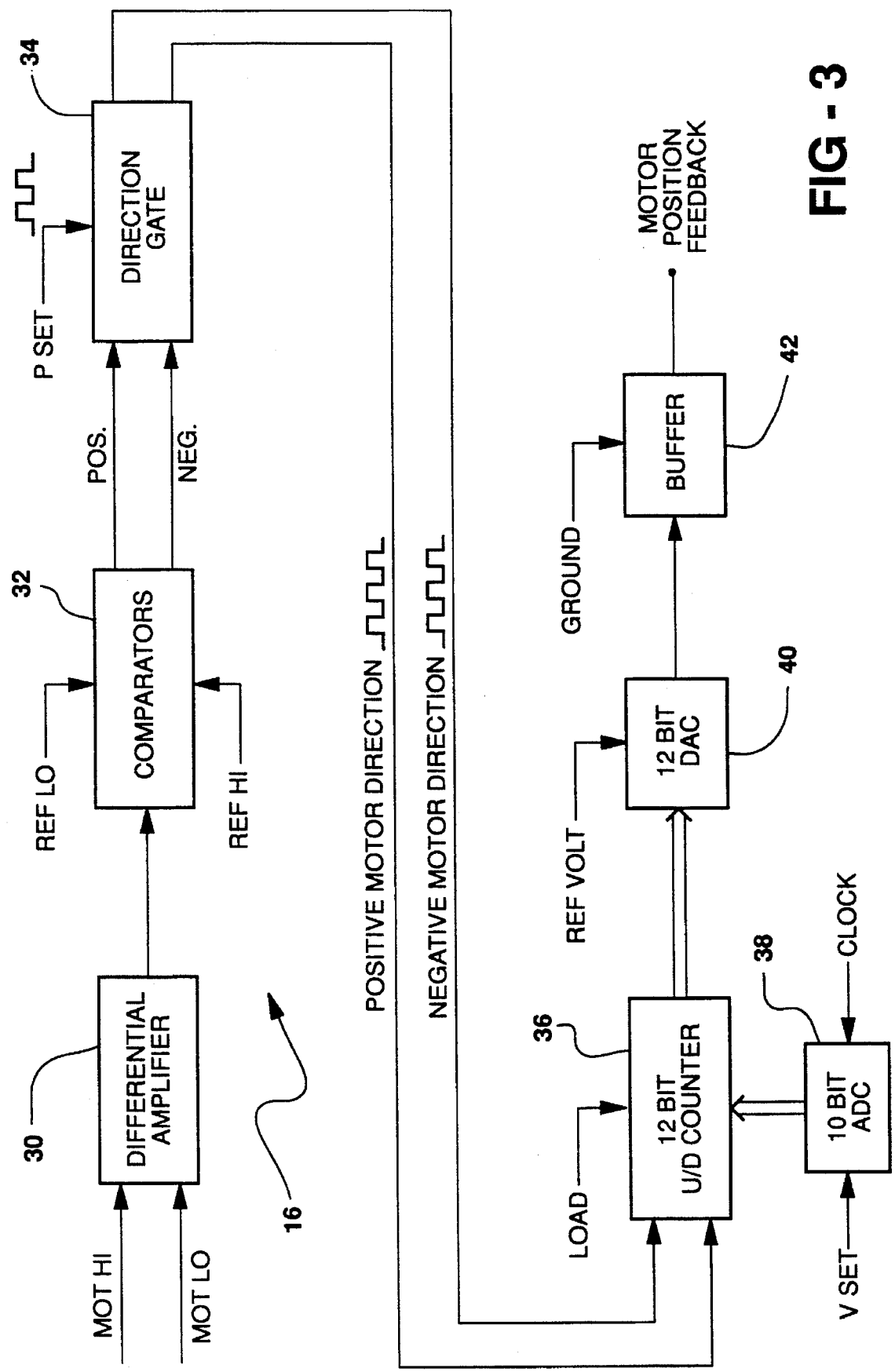

MOTOR FEEDBACK SIMULATION FOR TEST EQUIPMENT

FIELD OF THE INVENTION

This invention relates to simulation of motor position feedback signals and particularly to a method and apparatus for producing motor position feedback signals for use in testing motor control equipment.

BACKGROUND OF THE INVENTION

In the development, repair or remanufacture of motor controls for motors which produce feedback signals indicative of the motor response, it is desirable to test the controls by evaluating the feedback response to control signals for normal operation as well as for motor fault conditions. For example, electronic climate control systems for automotive vehicles rely on such motors for operation of heating, ventilation and air control distribution. Some vehicle seat positioning systems also utilize this type of motor. The motors each incorporate a potentiometer which produces an analog feedback signal which indicates motor position or the position of the device driven by the motor. The control system then uses the information to determine the position of such devices to assist in deciding whether device adjustment is desirable or to establish whether the device or motor has reached a commanded position. It is necessary to accurately emulate all possible conditions of the motor feedback signal to the motor controller in various testing situations including product design, development, evaluation, manufacturing, quality assurance, and repair to verify product operation.

When developing or remanufacturing such controls it has been the practice to employ a motor of the appropriate type which is driven by the control and to monitor its feedback signal to determine the motor response. Since there are many types of such motors with different operating parameters, it is necessary to acquire many motors for test purposes as well as an inventory of back up motors in case of motor failure; maintenance of all those motors is also required. Moreover the use of actual motors limits the direct control or manipulation of the feedback signal required for comprehensive testing and evaluation of each controller. Another shortcoming is that known motor fault conditions are impossible to reproduce for diagnosis or testing of the controllers.

Another known practice tests motor control systems without actual motors: complex software is used to adjust an artificial motor feedback signal by monitoring the motor control voltages. The main problems with this approach are 1) the resolution and slope response of the feedback signal are sub-standard due to the complexity of software calculations, 2) product test time is increased by approximately 35% due to the software overhead required to generate the feedback signal, and 3) the test software design time may be increased by up to 20% since the software must by tailored to each motor type.

SUMMARY OF THE INVENTION

It is therefore an object of the invention to test motor controllers without actual motors or complex software to provide motor feedback in response to motor control signals. Another object is to accurately and inexpensively simulate motor feedback in response to motor control signals.

A motor feedback simulation circuit using both analog and digital circuits is programmed by a test controller to exhibit characteristics of a desired type of motor and the circuit emulates the motor by producing a feedback signal indicative of motor position in response to motor control signals produced by a motor controller which is being tested.

A test controller includes a microprocessor based computer which is programmed with parameters of a motor to be simulated and produces signals for programming the simulation circuit. The parameters are high and low threshold values for motor positive and negative direction, a rate value representing the motor speed or rate of change of position, and a position initializing value. A motor controller, which is the product being tested, produces a motor control voltage or pair of voltages which is applied to the simulation circuit to command motor operation. The motor controller and the test controller are operated in accordance with a test procedure so that the simulation circuit produces a prescribed feedback signal which satisfies test conditions for both normal motor response and motor failure conditions.

The analog input of the simulation circuit comprise a differential amplifier which receives two motor control signals and produces a single voltage, and a comparator compares that single voltage to the programmed thresholds to produce a positive motor direction command for a high voltage, a negative motor direction command for a low voltage, and no command for an intermediate voltage which signifies no motor operation. The motor rate value is supplied in the form of a frequency and a gate responsive to the comparator output applies the frequency to either the increment or the decrement port of an up/down counter according to motor direction or to neither port for no motor operation. The counter is preset to an initial value representing a beginning motor position and the frequency signal steps the counter value to indicate a change in motor position. A digital-to-analog converter (DAC) generates an analog feedback signal from the motor position values in the counter.

The method according to the invention sets an initial count representing a motor position and sets a rate of change of the count. It responds to a commanded motor direction and increments the count for one motor direction and decrements the count for the other direction. The incrementing or decrementing occur at the set rate of change and continues as long as the motor command is present, within the limits of motor movement. The count value is converted to an analog voltage which is the motor position feedback signal.

BRIEF DESCRIPTION OF THE DRAWINGS

The above and other advantages of the invention will become more apparent from the following description taken in conjunction with the accompanying drawings wherein like references refer to like parts and wherein:

FIG. 3 is a block diagram of the simulation circuit of FIG. 2, according to the invention.

DESCRIPTION OF THE INVENTION

While the ensuing description is directed to a simulation method and apparatus for testing motor controls used in automotive electronic climate controls, the invention is not limited to that application; rather it applies wherever it is desired to simulate the operation of motors having a position feedback. In addition, the description includes computer based test equipment for supplying signals corresponding to motor parameters, but it should be recognized that simple bench test devices including a power supply, potentiometers and a frequency generator which are manually set to produce the desired signals may be employed instead of the more sophisticated equipment.

Figure 1:
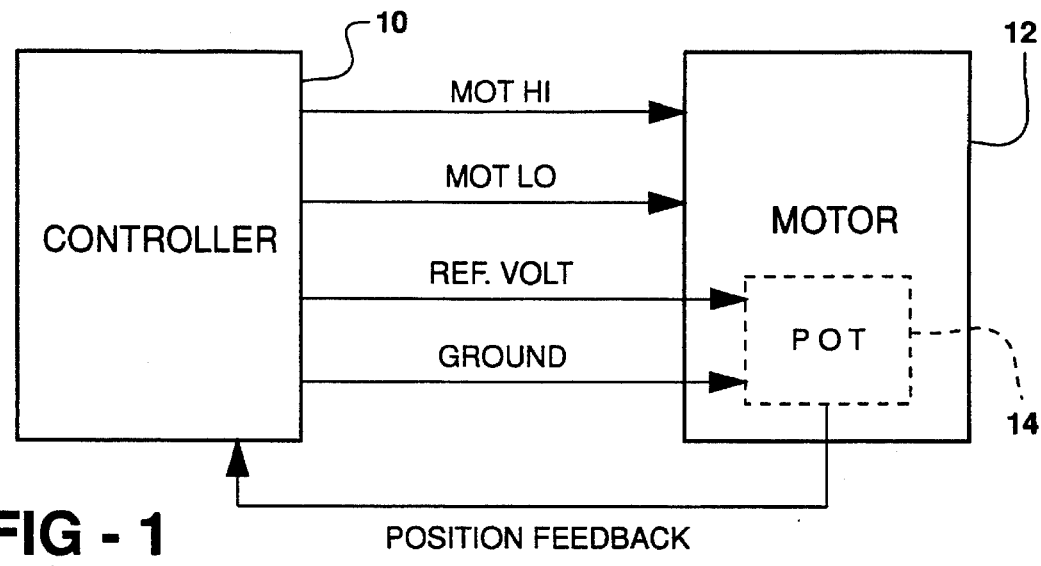
FIG. 1 is a schematic diagram of a conventional motor controller and motor with position feedback.

FIG. 1 depicts a motor controller 10 coupled to a motor 12 which drives a potentiometer 14 which produces a position feedback signal. The controller 10 produces dual voltage motor control signals MOTHI and MOTLO which are applied to the motor 12 and the motor responds to the differential voltage. Alternatively, the controller 10 may produce usually 5 volts, and a ground voltage from the controller 10. The position feedback signal is the center tap voltage which varies linearly between the reference and ground potentials according to motor position. The controller then is able to take motor position into account when determining what motor control signal to issue.

Figure 2:
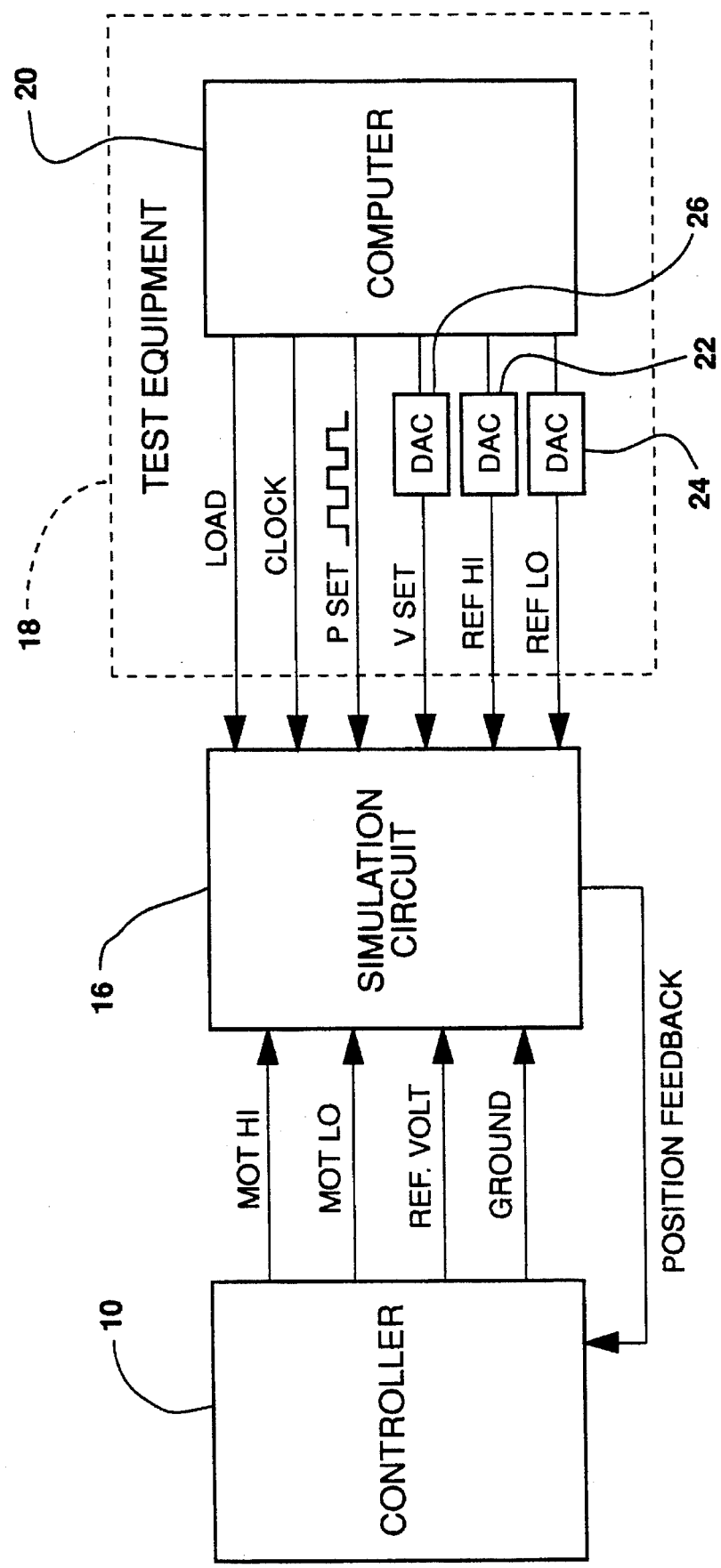
FIG. 2 is a schematic diagram of a controller test setup using a simulation circuit according to the invention.

FIG. 2 shows a test configuration for the motor controller 10 for use during controller development, repair or remanufacture. The motor 12 and potentiometer 14 of FIG. 1 are replaced by a simulation circuit 16. Test equipment 18 includes a computer 20 which programs the simulation circuit 16 with parameters specific to a motor being emulated. The parameters for each motor are loaded by an operator and the computer produces signals reflecting the parameters, which signals are applied to the simulation circuit 16 either directly or after conversion to analog form. High and low threshold voltages REFHI and REFLO are produced as digital values and then converted to analog voltages by DACs 22 and 24. Similarly a voltage VSET representing an initial motor position is digitally generated and converted to analog form by a DAC 26. Two strobe pulses LOAD and CLOCK are generated for applying the VSET value to the simulation circuit, and a frequency signal PSET is generated in accordance with motor speed and all are applied directly to the simulation circuit 16.

In general, an operator manipulates the controller 10 to effect certain motor operations and the computer supplies the appropriate setup parameters to the simulation circuit. For normal operation, the parameters are fixed so that the feedback signal reflects the result of the control signals. For fault simulation, certain changes are made to the parameters and diagnostic circuits in the controller are expected to detect the faults. It is preferred that the controller 10 and test equipment 18 operations be coordinated by a program in the computer 20 which displays test operations to be performed by the operator and the computer then supplies the appropriate parameters for each operation.

Referring to FIG. 3, the simulation circuit 16 has a differential amplifier 30 input which receives the MOTHI and MOTLO control voltages and produces a single output potential referenced to the ground of the simulation circuit to alleviate any ground differences that may occur between this circuit and the controller 10. A comparator circuit 32 compares the single voltage to the thresholds REFHI and REFLO supplied by the test equipment 18. If the voltage is above REFHI a positive comparator output is energized and if the voltage is below REFLO a negative comparator output is energized. Neither output is energized for intermediate voltages. A gate 34 is coupled to the comparators and to the PSET clock signal and responds to the positive and negative comparator outputs to correspondingly output the clock signal on a positive or a negative direction line. These direction lines are connected to increment and decrement ports of a 12 bit up/down counter 36. A 10 bit analog-to-digital converter (ADC) 38 receives the analog VSET voltage and, upon receipt of a CLOCK strobe pulse, converts the voltage to a digital value which is supplied to the counter 36. The LOAD strobe pulse is applied to the counter to cause loading of the 10 bit data from the ADC 38 to thereby initialize the counter content. The count is converted to an analog voltage by a 12 bit DAC 40 which is referenced to the controller reference voltage, typically 5 volts, and the output is coupled to a buffer 42 which has a ground referenced to the controller ground voltage to produce a motor position feedback which is accurately referenced to the controller voltages. Since the counter 36 and DAC 40 are 12 bits the feedback voltage has fine resolution which is 1.2 mv increments for a 5 volts reference.

The slope of the feedback signal during simulated motor operation is determined by the clock frequency of PSET. The frequency is determined by PSET=$(2^n)$*m/Vc, where n is the number of DAC bits, m is the motor feedback slope, and Vc is the controller reference voltage. Thus if n=12 bits, the feedback rate is m=1 volt/sec, and the reference voltage is Vc=5 volts, PSET=819.2 Hz.

Figure 4A:
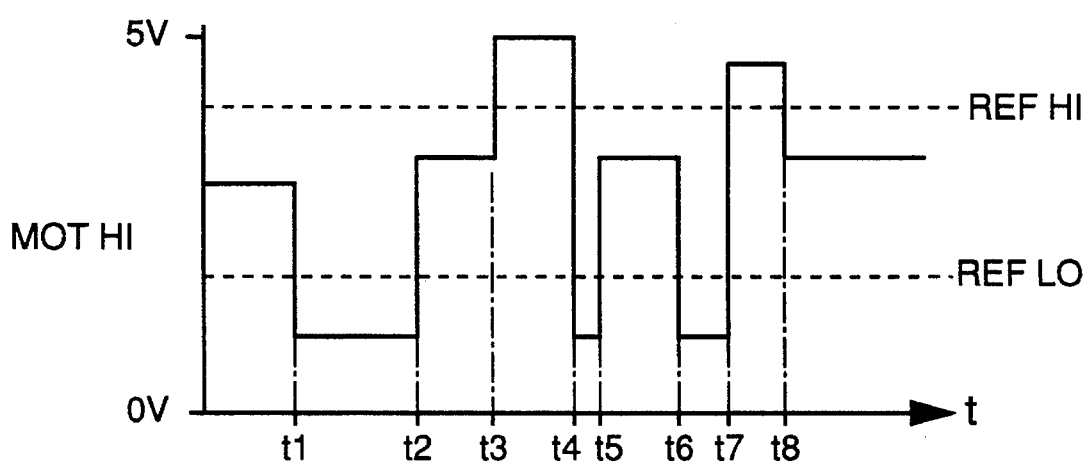
FIGS. 4A and 4B are voltage waveform diagrams of controller output and feedback signal illustrating the operation of the simulation circuit.
Figure 4B:
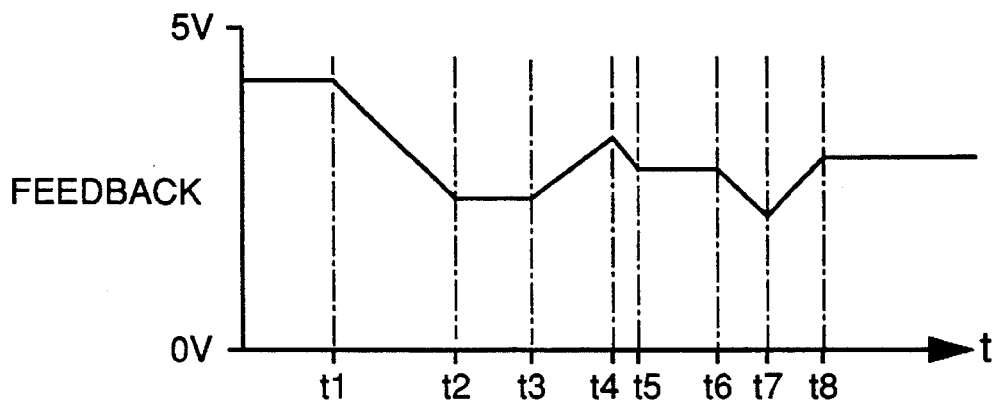

FIGS. 4A and 4B illustrate the controller output MOTHI and the feedback signal for a single input control motor. In this example, the control signal MOTHI can vary between 0 and 5 volts (MOTLO is tied to ground), the motor moves clockwise (positive) for voltages above 4 volts and counter clockwise (negative) for voltages below 1.8 volts. Thus the test equipment sets REFHI at 4 volts and REFLO at 1.8 volts. No motor movement occurs for voltages between these thresholds. The feedback signal (FIG. 4B) is initialized at 4.5 volts by VSET. As the MOTHI signal is varied by the controller it goes below the REFLO threshold in periods t1–t2, t4–t5, and t6–t7; the feedback signal slopes down in these same periods. In the same way, when the MOTHI signal goes above the REFHI threshold in periods t3–t4 and t7–t8, the feedback signal slopes up. The feedback is flat for other periods representing no movement.

As an example of a dual input motor simulation, both control signals MOTHI and MOTLO are active and the voltage differential Vo determined by the differential amplifier 30 may be Vo>5.8 volts for clockwise movement, Vo<–5.8 volts for counter clockwise movement, and intermediate voltages result in no movement. The test equipment will be set at REFHI=5.8 volts, REFLO=–5.8 volts, and if the average feedback slope is m=2 volts/sec and the reference voltage is 5 volts, PSET=1638 Hz. VSET will be at any desired starting value or motor position for the ensuing test.

The test method then comprises establishing the parameters for a particular motor type including threshold voltages, motor speed or rate, and initial position; determining the commanded motor direction, if any, from the control signal; setting a count value representing the initial position; producing a frequency representing the motor rate and incrementing or decrementing the count value representing motor position; and producing an analog feedback signal from the count value.

The above method tests normal motor operation but the apparatus is capable of readily simulating motor faults. This is useful to test the diagnostic ability of the motor controller to detect motor faults. In some cases the controller will be designed to identify the specific type of fault and in other cases only indicate that a fault occurred. For each type of motor fault normal settings are used for REFHI and REFLO, and the LOAD and CLOCK signals are strobed to initialize the feedback level.

To test for feedback shorted to ground, the equipment settings are PSET=0 Hz and VSET=0 v, and normal control signals are applied by the controller. Thus the feedback is set to zero volts and with PSET at zero, the motor feedback signal never changes; therefore the controller will conclude that the feedback is shorted to ground or that the motor is not responding to the control inputs.

To test for feedback shorted to the controller reference voltage, the equipment settings are PSET=0 Hz and VSET=5 v, and normal control signals are applied by the controller. Thus the feedback is set to five volts and with PSET at zero, the motor feedback signal never changes; therefore the controller will conclude that the feedback is shorted to the controller reference voltage or that the motor is not responding to the control inputs.

To test for feedback not responding to control signals, the equipment settings are PSET=0 Hz and VSET is any intermediate voltage, and normal control signals are applied by the controller. Thus with PSET at zero, the motor feedback signal never changes; therefore the controller will conclude that the feedback is not responding to the control inputs or that the motor is frozen (stalled).

To test for feedback out of tolerance, PSET is set to a frequency above or below the normal frequency range and VSET is set to any voltage in the normal range of the controller, and normal control signals are applied by the controller. The controller will sense the motor feedback changing at an improper rate and set a fault indication. A PSET frequency above the normal range simulates a free-running motor and a frequency below the normal range simulates a sluggish condition.

It will be seen that the method and apparatus of this invention eliminates the use of actual motors for testing the controller permits software configuration of the simulation circuit to replicate various types of motor feedback slopes. It is capable of generating motor feedback signals with the consistent response and resolution of actual motor feedback signals. This circuit can simulate motor position to within 0.61 mv of an actual motor feedback signal. In addition, the user is able to dynamically change the motor feedback signal during the motor controller operation. This aids in the evaluation and development of controller hardware, software, and controller calibration tolerances. The method and apparatus allows user programmable control of known fault conditions such as free-running and stalled conditions; this flexibility is especially important for controller hardware/software design and the development of calibration parameters.

The embodiments of the invention in which an exclusive property or privilege is claimed are defined as follows:

1. A method of simulating motor position feedback in response to a motor control signal which commands directional motor movement and stationary modes comprising the steps of:

establishing a high threshold and a low threshold appropriate for the motor being simulated; and determining the commanded mode by comparing the motor control signal to the thresholds, where the motor control signal is an analog voltage and one motor direction is commanded when the analog voltage is above a high threshold and another motor direction is commanded when the analog voltage is below a low threshold;

when the mode is for motor movement in a commanded direction, producing a frequency signal having a frequency representing the rate of motor position change;

incrementing or decrementing the count of a counter in response to the frequency signal and direction wherein the count represents motor position; and generating a feedback signal by converting the count to an analog signal.

2. The invention as defined in claim 1 wherein an analog voltage between the high and low threshold represents a stationary mode and no frequency signal is produced in stationary mode.

3. The invention as defined in claim 1 wherein an initial count representing a starting motor position is loaded into the counter.

4. The invention as defined in claim 1 wherein the frequency signal comprises a first frequency signal produced for one motor direction and a second frequency signal produced for another motor direction; and the counter is decremented by the first frequency signal and incremented by the second frequency signal;

whereby the feedback signal varies in response to the motor control signal.

5. The invention as defined in claim 1 wherein the step of producing a frequency signal comprises:

establishing a frequency representing the rate of motor position change; and applying the frequency to a first frequency signal for a positive motor direction and to a second frequency signal for a negative motor direction.

6. A method of simulating motor position feedback in response to a motor control signal which commands positive and negative motor direction and stationary modes comprising the steps of:

establishing a table of parameters for the type of motor to be simulated, the parameters including high and low thresholds corresponding to minimal voltages for motor actuation in positive and negative directions, and to rate of change of motor position;

determining the commanded mode by comparing the control signal to the high and low thresholds;

producing a frequency signal having a frequency determined by the parameter representing the rate of motor position change;

incrementing a counter in response to the frequency signal when the control signal exceeds the high threshold, decrementing the counter when the control signal is below the low threshold, wherein the counter value represents motor position; and generating a feedback signal by converting the count to an analog signal.

7. The invention as defined in claim 6 including a method of simulating motor faults comprising the steps of:

applying a motor control signal which commands motor operation; and the step of producing a frequency signal comprises producing a frequency which represents an abnormal response to the control signal.

8. The invention as defined in claim 6 including a method of simulating a motor short to ground comprising the steps of:

applying a motor control signal which commands motor operation;

turning off the frequency signal; and setting the counter to a value representing zero voltage.

9. The invention as defined in claim 6 including a method of simulating a motor short to reference voltage comprising the steps of:

applying a motor control signal which commands motor operation;

turning off the frequency signal; and setting the counter to a value representing the reference voltage.

10. The invention as defined in claim 6 including a method of simulating a free-running motor comprising the steps of:

setting the counter to a value representing some motor position;

applying a motor control signal which commands motor operation; and producing a frequency signal having a frequency higher than that determined by the parameter representing the rate of motor position change.

11. The invention as defined in claim 6 including a method of simulating a slowly responding motor comprising the steps of:

setting the counter to a value representing some motor position;

applying a motor control signal which commands motor operation; and producing a frequency signal having a frequency lower than that determined by the parameter representing the rate of motor position change.

12. A feedback simulation circuit for simulating operation of a motor having position feedback in response to signals from a motor controller producing high and low control signals and from test equipment providing threshold values and a motor rate value, the circuit comprising:

an input circuit for receiving the control signals and producing a single control voltage;

comparator means coupled to the input circuit for comparing the single control voltage to thresholds to determine motor direction commands for positive or negative direction;

an up/down counter having a count value representing motor position;

rate means responsive to the motor direction commands for applying a frequency signal corresponding to the motor rate value to the up/down counter to increment or decrement the count value in accordance with commanded motor direction;

and means responsive to the count value for generating a motor position feedback signal.

13. The invention as defined in claim 12 wherein the motor rate value is expressed as a frequency signal and wherein:

the counter has an increment port and a decrement port;

the rate means comprises a gate responsive to the motor direction commands for coupling the frequency signal to the increment port or the decrement port of the counter, whereby the count value varies according to the commanded change in motor position.

14. The invention as defined in claim 12 wherein the test equipment supplies a position initializing value, the circuit including:

means responsive to the position initializing value for setting the count value to represent a starting motor position.

15. The invention as defined in claim 12 wherein the test equipment supplies a position initializing value expressed as an analog voltage, the circuit including:

initializing means responsive to the position initializing value for setting the count value to represent a starting motor position;

the initializing means including an analog to digital converter for generating a digital value corresponding to the analog voltage and means for loading the digital value into the counter.

16. The invention as defined in claim 12 wherein the means responsive to the count value for generating a motor position feedback signal comprises a digital to analog converter which produces a feedback voltage corresponding to the count value.

\* \* \* \* \*